Figure 1:
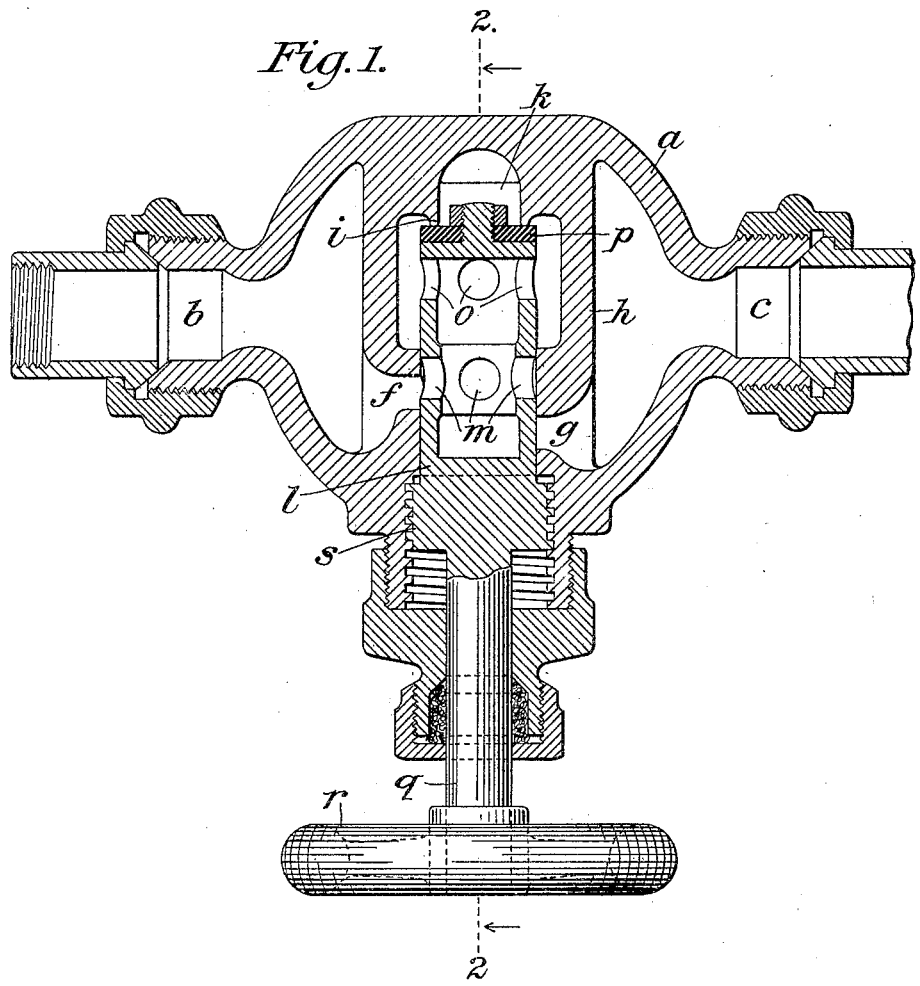

No. 804,913. PATENTED NOV. 21, 1905.
P. ALLAN.
VALVE.
APPLICATION FILED APR. 19, 1904.

2 SHEETS—SHEET 1.

Witnesses:
Chas. W. King.
A. W. Jesbera

Inventor:
Percy Allan
by Redding, Kiddle & Greeley
Attys.

No. 804,913. PATENTED NOV. 21, 1905.
P. ALLAN.
VALVE.
APPLICATION FILED APR. 19, 1904.
2 SHEETS—SHEET 2.
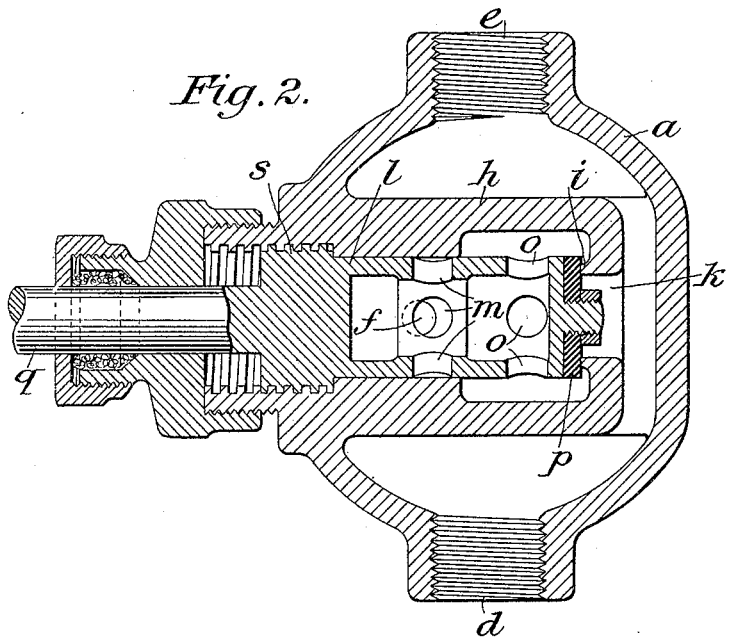
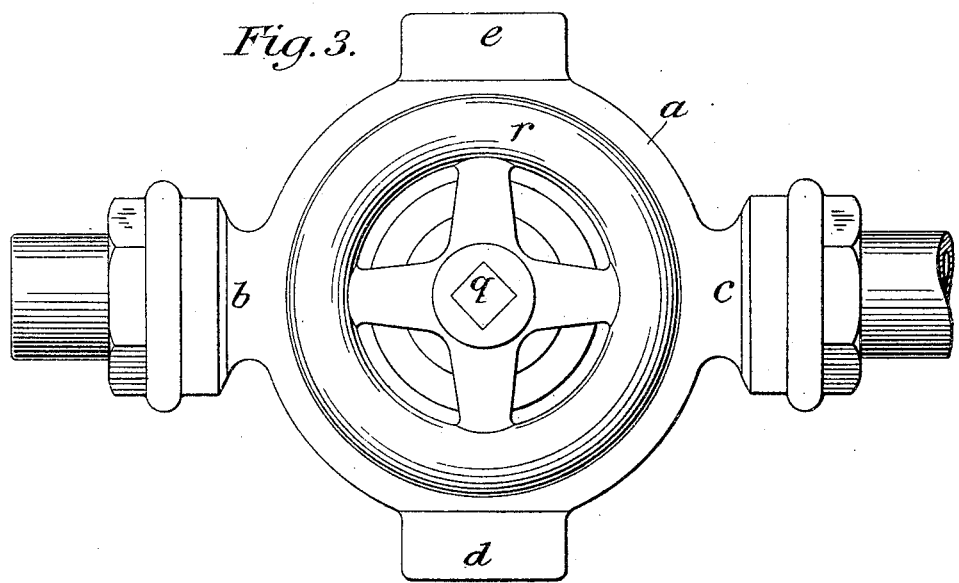

UNITED STATES PATENT OFFICE.

PERCY ALLAN, OF MONTCLAIR, NEW JERSEY, ASSIGNOR TO JENKINS MANUFACTURING COMPANY, OF BLOOMFIELD, NEW JERSEY, A CORPORATION OF NEW JERSEY.

VALVE.

No. 804,913.  Specification of Letters Patent.  Patented Nov. 21, 1905.

Application filed April 19, 1904. Serial No. 203,823.

*To all whom it may concern:*

Be it known that I, PERCY ALLAN, a citizen of the United States, residing in Montclair, in the State of New Jersey, have invented certain new and useful Improvements in Valves, of which the following is a specification, reference being had to the accompanying drawings, forming a part hereof.

This invention relates to valves of the class or type known as "mixing-valves" or "anti-scalding valves," the same being used commonly as a bath-room accessory for the admission to the bath-tub or shower of either hot water or cold water separately, or of the two together, in such proportions as to secure the desired temperature in the mixture.

The special object in view in this invention is to simplify and improve the construction and operation of such valves, although some of the features of construction may be applied to valves intended for other specific uses.

The invention will be fully described hereinafter with reference to the accompanying drawings, in which for purposes of illustration and explanation of the nature of the invention it is illustrated as embodied in a convenient and practical form.

In the drawings, Figure 1 is a view in horizontal central section of a valve which embodies the invention. Fig. 2 is a view of the same in vertical central section on the plane indicated by the line 2 2 of Fig. 1. Fig. 3 is a face view of the valve.

The shell or body $a$ of the valve, which may be formed in any suitable manner, is provided with an inlet $b$ for cold water and an inlet $c$ for hot water. It may also be provided with two outlets, as shown at $d$ and $e$ in Fig. 2, either or both of which may be used, as desired. The inlets $b$ and $c$ communicate, respectively, by cored passages within the shell or body of the valve with ports $f$ and $g$, formed in the opposite walls of the inner body or central portion $h$, which is provided with a seat $i$ for the valve-plug and with a central outlet-port $k$, which communicates through a suitable cored passage, as clearly shown in Fig. 2, with the outlets $d$ and $e$. As will be observed by referring to Fig. 1, the ports $f$ and $g$ are offset or communicate with the interior of the inner body $h$ at different points for a purpose presently to be described. The valve-plug $l$ is hollow and closed at both ends, as shown in Figs. 1 and 2, and is provided with inlet-ports $m$ and outlet-ports $o$ and may carry upon its closed end a washer $p$ to make a tight closure against the valve-seat $i$. The hollow valve-plug $l$ may be formed in one piece with the valve-stem $q$, which is provided with a suitable handle $r$, as usual, and may have the usual threaded engagement with the valve body or shell $a$, as indicated at $s$, whereby the rotation of the hand-wheel $r$ causes the valve-plug to be withdrawn from its seat or advanced to its seat, as desired. The ports $m$ in the construction shown are formed directly opposite each other in the valve-plug, and one of them may partly overlap the corresponding port $f$ in the inner body portion of the valve when the valve-plug is pressed against its seat, as shown in Fig. 1, so that the interior of the valve-plug shall be at that time in communication with the cold-water supply, and the cold water shall therefore be allowed to flow first when the valve-plug is withdrawn from its seat $i$, thereby preventing all danger of scalding through an accidental admission of the hot water first. As the movement of the valve-plug from its seat is continued the ports $m$ are first brought into full registration with the port $f$, thereby allowing a free flow of cold water, and thereafter the ports $m$ overlap and then register fully with the port $g$, thereby permitting a gradually-increased flow of hot water, while the flow of cold water is correspondingly reduced until, if desired, a flow of hot water alone is secured. When the valve-plug is advanced toward its seat, the flow of hot water is gradually reduced and finally cut off altogether, and the flow of cold water is at first increased and then reduced and finally cut off altogether when the valve-plug reaches its seat $i$. It is also obvious that the ports might have such relative arrangement as to cut off altogether the flow of either hot or cold water without the use of the washer $p$ and the valve-seat $i$; but the construction shown permits the valve to be somewhat more compact and also enables a tight closure to be made.

Other variations of form and construction of the various parts will readily suggest themselves and may be made without departing from the spirit of the invention.

I claim as my invention—

In a mixing-valve the combination of a shell or body provided with separate oppositely-arranged inlets for hot and cold water and an outlet in the same vertical plane with the inlets, of an inner body having offset ports communicating respectively with the inlets and having an outlet at one end communicating with the outlet, a valve-seat and a chamber between the valve-seat and the offset ports, and a longitudinally-movable hollow valve-plug closed at its inner end to coöperate with the valve-seat, having a series of ports arranged in the same vertical plane adapted to register with the offset ports and having a port to communicate with the chamber, substantially as described.

This specification signed and witnessed this 16th day of April, A. D. 1904.

PERCY ALLAN.

In presence of—
  JOEL JENKINS,
  M. M. WAY.